(12) United States Patent
Einzmann et al.

(10) Patent No.: US 11,371,173 B2
(45) Date of Patent: Jun. 28, 2022

(54) PROCESS AND DEVICE FOR THE FORMATION OF DIRECTLY-FORMED CELLULOSIC WEBS

(71) Applicant: LENZING AG, Lenzing (AT)

(72) Inventors: Mirko Einzmann, Wels (AT); Malcolm Hayhurst, Bulkington (GB); Ibrahim Sagerer-Foric, Vöcklabruck (AT)

(73) Assignee: LENZING AG, Lenzing (AT)

( * ) Notice: Subject to any disclaimer, the term of this patent is extended or adjusted under 35 U.S.C. 154(b) by 11 days.

(21) Appl. No.: 16/342,848

(22) PCT Filed: Oct. 18, 2017

(86) PCT No.: PCT/AT2017/000071
§ 371 (c)(1),
(2) Date: Apr. 17, 2019

(87) PCT Pub. No.: WO2018/071928
PCT Pub. Date: Apr. 26, 2018

(65) Prior Publication Data
US 2019/0264356 A1    Aug. 29, 2019

(30) Foreign Application Priority Data

Oct. 21, 2016  (AT) .................................. A490/2016

(51) Int. Cl.
*D04H 1/56*    (2006.01)
*D01D 5/14*    (2006.01)
(Continued)

(52) U.S. Cl.
CPC ........... *D04H 1/56* (2013.01); *B29C 48/0014* (2019.02); *D01D 5/14* (2013.01); *D01D 10/06* (2013.01); *D01F 2/00* (2013.01); *D04H 1/4258* (2013.01); *D04H 3/013* (2013.01); *D06C 29/005* (2013.01); *D10B 2201/22* (2013.01)

(58) Field of Classification Search
CPC .... D04H 1/56; D04H 1/4258; B29C 48/0014; D01D 5/24; D01D 10/06; D06C 29/005; D01F 2/00; D10B 2201/22; B04H 3/013
See application file for complete search history.

(56) References Cited

U.S. PATENT DOCUMENTS

| 6,022,447 A | 2/2000 | Radwanski et al. |
| 6,042,769 A | 3/2000 | Gannon et al. |

(Continued)

FOREIGN PATENT DOCUMENTS

| AT | 413285 B | 1/2006 |
| AT | 505621 A4 | 3/2009 |

(Continued)

OTHER PUBLICATIONS

International Search Report and Written Opinion issued in corresponding PCT/AT2017/000071 (8 pages).

*Primary Examiner* — Matthew J Daniels
*Assistant Examiner* — Andrew L Swanson
(74) *Attorney, Agent, or Firm* — Venable LLP

(57) ABSTRACT

This invention relates to a process and a device for manufacturing cellulose-based webs which are directly formed from lyocell spinning solution and in particular for the washing of directly formed cellulose webs.

21 Claims, 1 Drawing Sheet

(51) Int. Cl.
*D01D 10/06* (2006.01)
*D01F 2/00* (2006.01)
*D04H 1/4258* (2012.01)
*D04H 3/013* (2012.01)
*D06C 29/00* (2006.01)
*B29C 48/00* (2019.01)

(56) References Cited

U.S. PATENT DOCUMENTS

| | | | |
|---|---|---|---|
| 6,197,230 B1 | 3/2001 | Pierre et al. | |
| 6,645,409 B2 | 11/2003 | Feilmair et al. | |
| 7,922,943 B2 | 4/2011 | Gerking | |
| 9,334,592 B2 | 5/2016 | White et al. | |
| 2002/0008331 A1 | 1/2002 | Feilmair et al. | |
| 2004/0099981 A1 | 5/2004 | Gerking | |
| 2004/0207110 A1 | 10/2004 | Luo et al. | |
| 2005/0056956 A1* | 3/2005 | Zhao | D01F 2/00 264/37.24 |
| 2009/0186189 A1* | 7/2009 | White | D04H 1/4382 428/131 |
| 2011/0124258 A1 | 5/2011 | White et al. | |
| 2018/0363177 A1* | 12/2018 | Strandqvist | D04H 1/46 |

FOREIGN PATENT DOCUMENTS

| | | |
|---|---|---|
| AT | 503625 B1 | 10/2013 |
| CN | 1320176 A | 10/2001 |
| CN | 101432476 A | 5/2009 |
| CN | 105463703 A | 4/2016 |
| EP | 1093536 B1 | 4/2001 |
| EP | 1358369 B1 | 11/2003 |
| EP | 2013390 B1 | 1/2009 |
| JP | 2000517008 A | 12/2000 |
| JP | 2009535521 A | 10/2009 |
| RU | 2144101 C1 | 1/2000 |
| WO | 97/45574 A1 | 12/1997 |
| WO | 98/07911 A1 | 2/1998 |
| WO | 98/26122 A1 | 6/1998 |
| WO | 99/47733 A1 | 9/1999 |
| WO | 99/64649 A1 | 12/1999 |
| WO | 2005/106085 A1 | 11/2005 |
| WO | 2006/035458 A1 | 4/2006 |

* cited by examiner

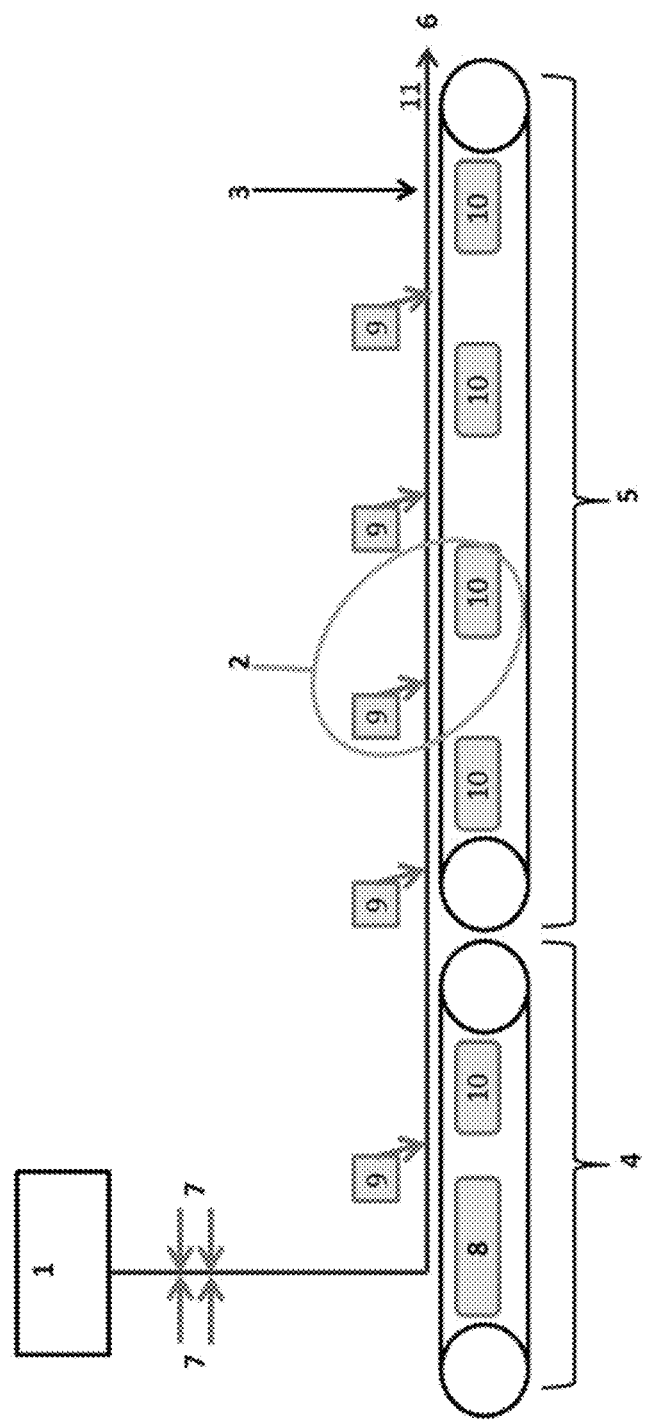

PROCESS AND DEVICE FOR THE FORMATION OF DIRECTLY-FORMED CELLULOSIC WEBS

The present application is a national-stage entry under 35 U.S.C. § 371 of International Patent Application No. PCT/AT2017/000071, published as WO 2018/071928 A1, filed Oct. 18, 2017, which claims priority to Austrian Patent Application No. A490-2016, filed Oct. 21, 2016, the entire disclosure of each of which is incorporated by reference herein.

BACKGROUND OF THE INVENTION

Field of the Invention

This invention relates to a process and a device for manufacturing cellulose-based webs which are directly formed from lyocell spinning solution and in particular for the washing of directly formed cellulose webs.

Prior Art

Lyocell technology is the direct dissolution of cellulose wood pulp or other cellulose-based feedstock in a polar solvent (for example n-methyl morpholine n-oxide, hereinafter referred to as 'amine oxide' or 'AO') to produce a viscous highly shear-thinning solution which can be formed into a range of useful cellulose-based materials. Commercially, the technology is used to produce a family of cellulose staple fibres (commercially available from Lenzing AG, Lenzing, Austria under the trademark TENCEL®) which are widely used in the textile and nonwovens industries. Other cellulose products from lyocell technology such as filaments, films, casings, beads & sponges have also been disclosed.

Cellulose staple fibres have long been used as a component for conversion to nonwoven webs. However, adaption of lyocell technology to produce nonwoven webs directly would access properties, performance and markets not possible for current cellulose web products. This could be considered as the cellulosic equivalent of the meltblow & spunbond technologies widely used in the synthetic fibre industry, although it is not possible to directly adapt synthetic polymer technology to lyocell due to important technical differences.

Much research has been carried out to invent novel technology to directly form cellulose webs from lyocell solutions (inter alia, WO 98/26122, WO 99/47733, WO 98/07911, U.S. Pat. No. 6,197,230, WO 99/64649, WO 05/106085, EP 1 358 369, EP 2 013 390). For the purposes of the present invention, the term "lyocell melt-blowing process" encompasses both meltblown & spunbond processes which can result in essentially endless filaments, fibres of a discrete length or mixtures of endless filaments and fibres of discrete length being obtained. The processes disclosed in the above-referenced documents are characterised in that extruded threads of the cellulose solution in NMMO are picked up by a gas stream flowing in a generally parallel direction to the path of the filaments. The cellulose solution, which is ejected through the orifices, is formed to liquid strands or latent filaments, which are drawn (or significantly decreased in diameter and increased in length and may be split into several sub-filaments) by the gas stream. Partial coagulation of latent filaments by wash liquor prior to web formation is also disclosed. The filaments are then formed into a web and further processed, as required.

Problem

Previous disclosures of lyocell melt-blown process technology have focused on providing inventive solutions to the major technical challenges of initial filament formation from lyocell spinning solution. However, any success in this area leads to the requirement for further developments for subsequent process steps, e.g. in washing. Washing of lyocell filaments is a critical process step, in which the solvent has to be removed from the thermoplastic cellulose/solvent threads in a controlled manner (prior to, during and after web formation) to begin developing fibre structure & properties and leaving cellulose/water filaments ready for further processing or finishing/drying. Initial lay-down of filaments to form web occurs during the washing step. Successful washing of directly-formed cellulose webs requires achievement of a unique combination of highly demanding requirements:

Control degree of merging and diameter variation of first-formed filaments prior to and during initial web formation Minimise potential damage to weak/tender intermingled filaments in first-formed web as well as to the structure of the web Controlled liquor exchange to allow fibre structure development Minimise consumption of water (or other washing fluids), in line with environmental characteristics of the technology and to minimise solvent recovery costs Minimise the total investment costs for equipment and building as well as the energy costs for washing There is no prior art which achieves all of the above requirements. Paper making technology, while capable of line speeds of more than 1500 m/min, is not applicable as paper sheets are much more robust than the webs of this invention and in paper making there is no need to wash out solvents and change filament structure during manufacture. Continuous filament cellulose yarn technology can operate at high line speeds. However, teaching on filament washing applies only to very small yarns and cannot be applied to the large webs of the current invention.

DESCRIPTION

The disadvantages of the state of the art have been solved by a new washing technology, including a process as well as a device, as disclosed here, which will enable full advantage to be taken of the potential offered by direct formation of cellulose-based webs from lyocell solutions. A representation of the invention is shown in FIG. 1. It will be understood by those skilled in the art that other layouts are possible.

Therefore a first embodiment of the invention presented herein is a process for manufacturing cellulose-based webs which are directly formed from lyocell spinning solution comprising:

An extrusion step using an extrusion device (1) capable of extruding a plurality of threads of lyocell solution, in particular arranged in one or more rows to form a curtain, and also capable of extending the solution threads, in particular according to the general meltblowing principle, as described in e.g. EP1093536B1.

A first washing step performed in a first washing zone with means (7) of delivering wash liquor to the solution threads directly after extension and prior to web formation, whereby partially coagulated cellulose filaments are formed. The purpose of this first wash step is to remove some of the solvent from the filaments, partially coagulating them, thus making their surface less sticky and hence controlling degree of filament merging as well as fixing the filament extension achieved. The wash liquor may be delivered by nozzles designed and arranged in a way as to provide essentially continuous lines of spray onto filaments. Depending on the design of the nozzles the spray may result in, for example, aerosol or mist. Very suitable is a series of spray nozzles mounted on either side of the filaments with the ability to control liquor flow rate and droplet size. The arrangement shall allow adjustment of position and angle of liquor application. The wash liquor used in this process step may be linked to the wash liquor used downstream or independent of it.

A web forming step performed in a web forming zone with a web forming device (4), which could be a sieve belt or alternatively a perforated drum, onto which the partially coagulated filaments are laid to form a web (11), wherein the web forming device (4) has porosity sufficient to allow gas stream and wash liquor to be extracted through it, e.g. by a liquid and air removal device (8). The forming device could be, for example, a belt or the outer, permeable surface of a drum able to operate at required web production speed. An essential feature of the forming device is to allow efficient management and removal of extrusion air and excess wash liquor from the spray nozzles. The forming device has permeability sufficient to allow gas stream and wash liquor to be extracted through it via a vacuum system for collection and processing or re-use, while allowing good filament lay-down for web formation. For example, belts with permeability around 4.000 to 15.000 $m^3/m^2/h$ at 100 Pa, e.g. 9000 $m^3/m^2/h$ at 100 Pa pressure difference have been found to be suitable. The suction pressure and the effective volumetric flow are determined so as to balance undamaged integrity of the web with maximized removal of liquid and sufficient fixation of the filaments on the belt. The forming zone may also be fitted with one or more washing modules, described in the next section. The combination of spinning solution throughput per orifice, filament extension conditions and speed of forming device controls web weight and filament fineness.

A second washing step performed in a second washing zone with a washing device (5) which includes multiple modular washing modules (2), wherein each washing module (2) comprising a means (9) of applying wash liquor to the web (11) in such a way as not to damage the web structure and the very fragile coagulated filaments, particularly during initial washing steps; and a dewatering device (10) for at least partially dewatering the web (11), e.g. by vacuum suction. On this washing device the web is transported from the forming device. It could be a part of the forming zone (for example a single belt or drum) or a separate device (eg a separate belt or drum). The washing device could itself be a single device (eg a belt or drum) or, for example, multiple belts or drums. It operates at the same production speed as the forming device and is equipped with multiple washing modules. The number of washing modules can be varied to achieve desired wash efficiency for the product being produced. Each washing module consists of a means of applying wash liquor uniformly ("uniformly" means up to 5% tolerance in variability of flow of the wash liquor) as a liquor curtain over the full width of the web to the web at a controlled rate and temperature and of sufficiently low force so as not to damage web or individual filaments. This can be achieved via a liquor supply box which consists of two chambers separated by a grid to even pressure drop and an outlet slot. All can be adjusted to suit liquor flow requirements. For each washing module, associated with each wash liquor application device is a dewatering device (for example vacuum suction) and wash liquor collection. Used wash liquor can then be transported from collection for re-use or solvent recovery. The dewatering device is positioned downstream of the wash liquor application device at a distance sufficient to enable adequate residence time for the wash liquor to act. Typically, the washing zone will operate in counter-current mode, with increasing amine oxide concentration as the wash liquor is pumped upstream while being used to wash the web.

A means (6) of collection for washed web (11) or transferring the web (11) directly to further processing stages.

The process can operate at line production speeds of the formed web (11) of from 5 m/min to 1000 m/min. In a preferred embodiment of this invention line production speeds may be from 25 to 500 m/min.

The wash liquor is water, water/amine oxide mix or another liquid suitable for removing solvent. In particular wash liquor which could be pure water, water/amine oxide mix or some other liquid suitable for removing amine oxide from filaments. For example, in the washing zone wash liquor could be fresh demineralized water introduced at the final wash stage and pumped counter-currently from each liquor collection stage to upstream wash liquor application devices. This used wash liquor can then either be sent to recovery for re-use in preparation of spinning solution or used as part of the feedstock for spraying filaments in the forming zone prior to web formation, then to recovery. Wash liquor temperatures can range from 5-85° C. Optionally, the facility to concentrate wash liquor at one or more wash stations via recirculation can be provided.

Line production speeds of the formed web (11) of about 5 m/min will be feasible for manufacturing thick fleece of up to 100 mm thickness. High line production speeds will be feasible for thin fleece.

In a preferred embodiment of the invention the wash liquor (7) in the first washing step is applied to the solution threads prior to web formation in a form such as continuous lines of spray, curtain, aerosol or mist by, among others, nozzles, slits, rotating nip rollers or rotating discs slinging the wash liquor towards the solution threads. Also other means fulfilling the same purpose will work for this invention.

In a further preferred embodiment of the invention the wash liquor used (7) in the first washing step is either the used wash liquor coming from the first wash module (2) in the second washing zone (5) or supplied independent of the wash liquor in the second washing zone.

In particular the forming device (4) can be a sieve belt or a perforated drum, wherein permeability of the forming device (4) is selected to enable passage of gas stream and wash liquor while allowing good web formation, preferably between 4.000 and 15.000 $m^3/m^2/h$ at 100 Pa pressure difference.

According to the process of the invention the second washing device (5) may be operated in counter-current mode with fresh wash liquor added at the furthest downstream washing module (2).

According to the process of the invention in each washing module (2) the wash liquor application device (9) applies the wash liquor as a uniform, closed liquor curtain over the full width of the web (11) at a controlled rate and temperature. The means (9) should in particular not supply the wash liquor as individual threads as those threads could damage the web structure and the very fragile coagulated filaments, particularly during initial washing steps. Also wash liquor mist or the like will not fulfill the purpose of this invention.

In a particularly preferred embodiment of the invention in each washing module (2) the dewatering device (10) is positioned downstream of the wash liquor application device (9) at a distance sufficient to enable adequate residence time per wash module for the wash liquor to act.

It was found that the process according to the invention can be operated in a very economic way if the adequate residence time per wash module is from 0.06 to 120 sec, preferably from 0.12 to 12 sec, in particular preferred from 0.24 to 6 sec. Surprisingly it was found that by this simple teaching an optimum between the number of wash modules (2) and the total wash line length (i.e. the total length of the washing device (5) consisting of all wash modules (2)) could be found. Bigger numbers of wash modules as well as bigger wash line length would both increase investment cost and running more wash modules would also increase the operating cost due to increased need for wash liquor and energy for pumping and vacuum.

As explained earlier, a key requirement of the process is a good set up between the number of wash modules and the total length of the washing zone. Surprisingly, it has been discovered that an optimum of the aforementioned requirements can be determined by changing the residence time of the newly-invented wash modules in the washing zone according to the time ranges just given above, giving an overall reduction in washing zone length. Using this teaching, total residence time in a washing zone for high speed production of webs is reduced by at least 10% at 25% amine oxide concentration in the last wash module. In addition, the number and separation of wash modules in the washing zone can be altered to optimise washing efficiency for each product type (for example different web thicknesses).

It may be also a preferred embodiment of the inventive process if all wash modules (2) of the washing device (5) show essentially the same design and the same residence time per wash module. This facilitates the engineering of the washing device (5) as well as its operation, as no individual differences have to be considered. For specific requirements, e.g. for the production of special products, of course also different wash modules may be used.

In order to increase wash liquor solvent concentration one or more of the wash modules (2) may have means to recirculate wash liquor internally, i.e. within this same wash module. In such an operation mode only part of the used wash liquor will be forwarded to the subsequent wash module (2). To maintain viable process economics, it is important that used wash liquor for solvent recovery has an amine oxide concentration of at least 15%, preferably 20%, most preferably greater than 25%.

The process according to the invention may further include a process step for the addition of finish application and/or in-line hydroentanglement (3) to the web (11). Such process steps are in general well known to the skilled in the art, for hydroentanglement e.g. as described in EP 2 013 390. Optionally, for example the end of the washing zone can incorporate a means to apply finishes to the washed web.

The process according to the invention as described above may further include admixing material to the web (11) by dissolving or dispersing said material in the fluid of a hydroentanglement step (3). This material could be e.g. a flame-retardant compound, a colour dye, a crosslinking agent, a softener, a chitosan or chitosan derivative or the like. Various other modifying substances, such as dyestuffs, antibacterial products, ion-exchanger products, active carbon, nanoparticles, lotions, superabsorbers, impregnating agents, finishing agents, grafting agents, binders; and mixtures thereof can be added during or beneath the washing steps in the washing zone or in similar, subsequent process steps. The skilled artisan is well aware of how to add such above-referenced materials in which step of the lyocell melt-blowing process. This invention is equally applicable for the application of solution-based chemical treatments or dispersed solid particles to the cellulose web. It is also equally applicable to cellulose webs wherein the cellulose contains incorporated additives. Other applications for the invention will occur to those skilled in the art.

The process according to the invention may further include means for attaching to said web (11) on one or both sides a layer of a further material, preferably a fiber-, film- or web-layer at any point in the process. For example the web according to the present invention could be formed directly onto another material introduced onto the forming zone upstream of the point of formation of web of the invention. Webs could also be combined at any point on the washing zone or downstream. The properties of the combined laminate web would be directly influenced by where initial web combining occurred.

With this embodiment, it is possible to produce composite materials made up by e.g. one layer of the cellulosic web produced according to the invention and one or more additional layers on one or both sides of the web. "Sandwich" constructions, wherein the cellulosic web is embedded between two, optionally different, layers of e.g. a film or web-like material, are possible. Said layer may essentially consist of a material selected from the group consisting of cellulosic materials, such as cellulosic fibers and pulp; non-cellulosic polymers; and mixtures thereof. Further details of possible multilayer materials are given in sections [0031] to [0048] of EP 2 013 390.

The fully washed web can then be further processed, as required (for example collected as a never-dried roll or transported direct to a drying stage).

All equipment employed is constructed in such a way as to enable recovery of energy, water vapour and chemicals and to prevent droplets of wash liquor or other liquids dripping on to the web in an uncontrolled manner. For example, protective hoods over the wash line are suitably angled to ensure any condensation formed runs to a side of wash line rather than onto the web.

Another aspect of the invention is a nonwoven product consisting of essentially endless filaments and obtainable by the process as described herein with a basis weight of between 5 to 250 gsm. Such a product can be manufactured in an economic way only by the process described herein.

Another aspect of the invention is a device for manufacturing cellulose-based webs which are directly formed from lyocell spinning solution comprising:

an extrusion device (1) capable of extruding a plurality of threads of lyocell solution, in particular arranged in one or more rows to form a curtain, and also capable of extending the solution threads as described eg. in EP1093536B1, a first washing zone with means (7) of delivering wash liquor to the solution threads directly after extension and prior to web formation, whereby partially coagulated cellulose filaments are formed, a web forming zone with a web forming device (4) as described above already onto which the partially coagulated filaments are laid to form a web (11), wherein the web forming device (4) has porosity sufficient to allow gas stream and wash liquor to be extracted through it, e.g. by a liquid and air removal device (8), a second washing zone with a washing device (5) which includes multiple modular washing modules (2), wherein each washing module (2) comprising a means (9) of applying wash liquor to the web (11) in such a way as not to damage the web structure and the very fragile coagulated filaments (particularly during initial washing steps) and a dewatering device (10) for at least partially dewatering the web (11), e.g. by vacuum suction, and a means (6) of collection for washed web (11) or transferring the web (11) directly to further processing stages, and that the device can operate at line production speeds of the formed web (11) of from 5 m/min (which would be feasible for thick fleece of up to 100 mm thickness) to 1000 m/min.

Preferably the device according to the invention is designed to operate at line production speeds of from 25 to 500 m/min. The according to the invention is designed in such a way to be able to operate with a wash liquor which is water, water/amine oxide mix or another liquid suitable for removing solvent.

In a preferred embodiment of the invention the means for applying the wash liquor (7) to the solution threads prior to web formation consist of nozzles, slits, rotating nip rollers or rotating discs capable of slinging the wash liquor towards the solution threads. Also other means fulfilling the same purpose will work for this invention.

In particular the forming device (4) can be a sieve belt or a perforated drum, as already described above, wherein permeability of the forming device (4) is selected to enable passage of gas stream and wash liquor while allowing good web formation, preferably between 4.000 and 15.000 $m^3/m^2/h$ at 100 Pa pressure difference.

In particular the second washing device (5) is capable of operating in counter-current mode with fresh wash liquor added at the furthest downstream washing module (2).

In a preferred embodiment of the invention in each washing module (2) the wash liquor application device (9) is capable of applying the wash liquor as a uniform, closed liquor curtain over the full width of the web (11) at a controlled rate and temperature.

In a further preferred embodiment of the invention in each washing module (2) the dewatering device (10) is positioned downstream of the wash liquor application device (9) at a distance sufficient to enable adequate residence time per wash module for the wash liquor to act. The adequate residence time per wash module is from 0.06 to 120 sec, preferably from 0.12 to 12 sec, in particular preferred from 0.24 to 6 sec.

Preferably all wash modules (2) of the washing device (5) show essentially the same design and the same residence time per wash module. This facilitates the engineering of the washing device (5) as well as its operation, as no individual differences have to be considered. For specific requirements, e.g. for the production of special products, of course also different wash modules may be used.

In order to increase wash liquor solvent concentration one or more of the wash modules (2) may have means to recirculate wash liquor internally, i.e. within this same wash module. In such an operation mode only part of the used wash liquor will be forwarded to the subsequent wash module (2).

The device according to the invention may further include means for the addition of finish application and/or in-line hydroentanglement (3) to the web (11). Such means are in general well known to the skilled in the art, for hydroentanglement e.g. as described in EP 2 013 390.

The device according to the invention as described above may further include means for admixing material to the web (11) by dissolving or dispersing said material in the fluid of a hydroentanglement step (3). This material could be e.g. a flame-retardant compound, a colour dye, a crosslinking agent, a softener, a chitosan or chitosan derivative or the like.

The device according to the invention may further include means for attaching to said web (11) on one or both sides a layer of a further material, preferably a fiber-, film- or web-layer.

The invention will now be illustrated by examples. These examples are not limiting the scope of the invention in any way. The invention includes also any other embodiments which are based on the same inventive concept.

Examples 1 to 12

To produce a cellulosic web of basis weight 15 gsm with an average filament size of 1.0 dtex, lyocell spinning solution containing 13% cellulose is extruded vertically downwards from an arrangement of meltblown spinning beams as described in EP 1093536 B1 at an equivalent throughput of 200 kg/h cellulose per metre of web width. Flow and temperature of meltblow air supply are adjusted to achieve the required filament extension. The stretched filaments are then subjected to a first wash step: demineralised water at 30° C. is sprayed from single 'spray bars' on each long edge of the filament curtain. Each bar contains spray nozzles arranged so as to provide a continuous line of aerosol droplets onto the filaments as described in EP 1093536 B1.

The partially coagulated filaments are then in the subsequent forming step deposited onto the forming device, which contains a horizontal porous conveyor belt moving at 476 m/min. A vacuum system operates below the belt to ensure even laydown of filaments to achieve a uniform web thickness and remove excess extrusion air and liquor from the spray nozzles. Belt permeability is 9000 $m^3/m^2/h$ and vacuum system generates 100 Pa pressure difference across the belt. Air and wash liquor are separated. Used wash liquor is sent to a solvent recovery unit for re-use in making spinning solution.

The web is transported on the belt to the washing zone, which is arranged as a later part of the same horizontal porous conveyor belt, consisting of a series of washing modules, each of which applies wash liquor as a 'curtain' onto the web. Wash liquor is then removed through the belt via a vacuum system. Washing modules are separated to ensure sufficient residence time for good wash efficiency. Wash liquor, which consists of demineralised water at 60° C., is introduced at the final wash module and pumped progressively upstream through each of the other wash modules in counter-current mode. Total consumption of demineralised water (in forming zone spray and wash zone) is approximately 6 $m^3$/hr per metre of web width. Used wash liquor is transferred to solvent recovery for re-use in preparation of spinning solution. The wet web is collected at the end of the wash line and then dried offline using a can dryer. 12 different washing zone setups were tested, wherein the length and the residence time of the single wash modules as well the number of modules were changed as listed in Table 1. All washing modules were of the same type.

TABLE 1

Plant design results

| Example | Module residence time (s) | Number of modules (n) | Total washline length (m) | Total residence time (s) | Reduction of Length (%) | Reduction of number of wash modules (%) |
|---|---|---|---|---|---|---|
| 1 | 0.44 | 41 | 143.5 | 18.1 | 0 | 0 |
| 2 | 0.63 | 25 | 125 | 15.8 | 13 | 39 |
| 3 | 0.82 | 19 | 123.5 | 15.6 | 14 | 54 |
| 4 | 1.01 | 15 | 120 | 15.1 | 16 | 63 |
| 5 | 1.20 | 13 | 123.5 | 15.6 | 14 | 68 |
| 6 | 1.39 | 11 | 121 | 15.2 | 16 | 73 |
| 7 | 1.58 | 10 | 125 | 15.8 | 13 | 76 |
| 8 | 1.76 | 9 | 126 | 15.9 | 12 | 78 |
| 9 | 1.95 | 8 | 124 | 15.6 | 14 | 80 |
| 10 | 2.14 | 8 | 136 | 17.1 | 5 | 80 |
| 11 | 2.33 | 7 | 129.5 | 16.3 | 10 | 83 |
| 12 | 2.52 | 7 | 140 | 17.6 | 2 | 83 |

Surprisingly it was found from those trials that for the same line speed, i.e. same capacity, the washline length and product quality can be reduced by between 2 to 16% and the number of wash modules from 39 to 83%.

What is claimed is:

1. A process for manufacturing cellulose-based webs which are directly formed from lyocell spinning solution comprising:
   a. employing an extrusion device capable of extruding and extending a plurality of lyocell solution threads, arranged in one or more rows to form a curtain,
   b. washing the lyocell solution threads with a continuous line of spray of a first wash liquor from spray nozzles, slits, rotating nip rollers or rotating discs in a first washing zone directly after extension and prior to web formation, whereby partially coagulated cellulose filaments are formed,
   c. laying the partially coagulated filaments on a web forming device in a web forming zone, wherein the web forming device has porosity sufficient to allow a gas stream and the first wash liquor to be extracted-to form a web,
   d. washing the web in a second washing zone with a washing device that includes multiple washing modules, wherein each washing module comprises a wash liquor supply box comprising two chambers and an outlet slot which applies a second wash liquor to the web as liquor curtain over the full width of the web at a controlled rate and temperature in such a way as not to damage the web and the coagulated filaments, and
   e. dewatering the web,
   wherein the process can operate at line production speeds from 5 m/min to 1000 m/min, and
   wherein the first wash liquor and the second wash liquor is capable of removing solvent.

2. The process of claim 1, the continuous line of spray is a curtain, an aerosol or a mist through the spray nozzles, slits, rotating nip rollers or rotating discs.

3. The process of claim 1, wherein the first wash liquor used in step b is either the second wash liquor from a washing module in the second washing zone or supplied independent of the second wash liquor in the second washing zone.

4. The process of claim 1, wherein permeability of the web forming device is selected to enable passage of the gas stream and the first or the second wash liquor between 4,000 and 15,000 m³/m²/h at 100 Pa pressure difference.

5. The process of claim 1, wherein the washing device is operated in counter-current mode with the second wash liquor added at a furthest downstream washing module.

6. The process of claim 1, wherein the liquor curtain is a uniform, closed liquor curtain.

7. The process of claim 6, wherein the dewatering step occurs after the web has an adequate residence time per washing module for the second wash liquor to act.

8. The process of claim 7, wherein the adequate residence time per washing module is from 0.06 to 120 sec.

9. The process of claim 7, wherein each washing module of the washing device comprises essentially the same design and the same residence time per washing module.

10. The process of claim 1, wherein one or more of the washing modules has the capability to recirculate wash liquor internally to increase wash liquor solvent concentration.

11. The process of claim 1, further comprising providing a finish application or in-line hydroentanglement to the web.

12. The process of claim 1, further comprising admixing a material to the web by dissolving or dispersing said material in a fluid of a hydroentanglement step.

13. The process of claim 1, wherein said web is attached on one or both sides to a layer of a further material.

14. The process of claim 1, wherein the first wash liquor is water/amine oxide mix or another liquid capable of removing solvents.

15. The process of claim 1, wherein the second wash liquor is water/amine oxide mix or another liquid capable of removing solvents.

16. The process of claim 8, wherein the adequate residence time per washing module is from 0.12 to 12 sec.

17. The process of claim 16, wherein the adequate residence time per washing module is from 0.24 to 6 sec.

18. The process of claim 13, wherein the further material is selected from the group consisting of a fiber-, film- or web-layer.

19. The process of claim 1, further comprising:
   e. collecting the web or transferring the web directly to further processing stages.

20. The process of claim 1, wherein the first and second wash liquor are the same.

21. The process of claim 1, wherein the first and second wash liquor are different.

* * * * *